(12) United States Patent
Moon et al.

(10) Patent No.: US 9,003,898 B2
(45) Date of Patent: Apr. 14, 2015

(54) MULTI-AXIS SENSOR

(71) Applicant: Research & Business Foundation Sungkyunkwan University, Suwon-si (KR)

(72) Inventors: Hyungpil Moon, Seongnam-si (KR); Jachoon Koo, Seoul (KR); Hyouk Ryeol Choi, Gunpo-si (KR); Seonggi Kim, Gangneung-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 177 days.

(21) Appl. No.: 13/719,680

(22) Filed: Dec. 19, 2012

(65) Prior Publication Data

US 2013/0152705 A1 Jun. 20, 2013

(30) Foreign Application Priority Data

Dec. 19, 2011 (KR) ........................ 10-2011-0137460

(51) Int. Cl.
*G01L 1/14* (2006.01)
*G01R 27/26* (2006.01)
*G01L 5/16* (2006.01)
*G06F 3/041* (2006.01)

(52) U.S. Cl.
CPC . *G01L 1/14* (2013.01); *G01L 1/146* (2013.01); *G01L 1/142* (2013.01); *G01L 5/165* (2013.01)

(58) Field of Classification Search
CPC .................... G01L 1/146; G01L 1/142; G06F 2203/04106; G06F 3/044; G06F 3/045
USPC .............. 73/724, 862.625–862.627; 324/658, 324/686, 691; 345/156, 173, 174
See application file for complete search history.

(56) References Cited

U.S. PATENT DOCUMENTS

| 4,370,697 | A | * | 1/1983 | Haberl et al. | ............... | 361/283.1 |
| 5,253,526 | A | * | 10/1993 | Omura et al. | ............... | 73/514.16 |
| 7,489,141 | B1 | * | 2/2009 | Vermeire et al. | ............... | 324/646 |
| 8,182,433 | B2 | * | 5/2012 | Leo et al. | ....................... | 600/587 |
| 8,451,011 | B2 | * | 5/2013 | Hayakawa et al. | ........... | 324/658 |
| 2012/0019479 | A1 | * | 1/2012 | Lin et al. | ....................... | 345/174 |
| 2012/0137791 | A1 | * | 6/2012 | Kung et al. | ............... | 73/862.626 |
| 2013/0018489 | A1 | * | 1/2013 | Grunthaner et al. | ............ | 700/73 |

FOREIGN PATENT DOCUMENTS

| JP | 2010506407 T | 2/2010 |
| JP | 2010122018 A2 | 6/2010 |
| KR | 10-2009-0114509 A | 11/2009 |
| KR | 10-2010-0036891 A | 4/2010 |

OTHER PUBLICATIONS

Korean Office Action issued Sep. 2, 2013 in counterpart Korean Patent Application No. 10-2011-0137460. (2 pages in Korean).
Korean Office Action issued Mar. 20, 2013 in Korean Patent Application No. 10-2011-0137460. (4 pages in Korean).

* cited by examiner

*Primary Examiner* — Lisa Caputo
*Assistant Examiner* — Jonathan Dunlap
(74) *Attorney, Agent, or Firm* — NSIP Law

(57) ABSTRACT

Provided herein is a multi-axis sensor including: a pair of electrodes positioned such that at least partial areas thereof face each other; an elasticity member having one of the pair of electrodes installed in its upper portion and another of the pair of electrodes installed in a lower portion; and a sensor unit electrically connected with the pair of electrodes, and configured to detect a change of capacitance value between the pair of electrodes and a change of resistance value of the elasticity member.

13 Claims, 4 Drawing Sheets

MULTI-AXIS SENSOR

CROSS-REFERENCE TO RELATED APPLICATIONS

This application claims the benefit of priority under 35 U.S.C. §119(a) of Korean Patent Application No. 10-2011-0137460, filed on Dec. 19, 2011, in the Korean Intellectual Property Office, the entire disclosure of which is incorporated herein by reference for all purposes.

BACKGROUND

1. Field

The following description relates to a sensor for detecting force or torque along a plurality of axes, and, for example, to a hybrid type multi-axis sensor that may measure a force along at least 2-axes using a pair of electrodes.

2. Description of Related Art

Sensors that measure or sense forces and torques are widely used in various devices, and these sensors range from those having simple structures to devices having electronic components that take precise numerical measurement.

In an external force sensor, a strain gauge may be attached to a structure in an orthogonal angle to measure a variance of electric resistance, and then the measured variance may be converted appropriately to determine the magnitude of the force. In other sensors, a structure having a spring system is installed, and a displacement of the spring caused by the external force is measured using a length measuring mechanism, and converted into a numerical measurement for the magnitude of the force.

However, many of external force sensors are not competitiveness in terms of production costs due to its complex manufacturing process that involves a process of incorporating a multi-phase sensor.

In addition, in applications where the measurements needed to be precise, such sensors cost too much, and cannot be installed in products in which quality thereof can be improved by having a sensor.

In order to resolve these problems, sensors that measure external force using capacitance values are under development, but a general capacitance value measurement type sensor only measures the force along one axis by detecting one capacitance value with one electrode. Therefore, to measure the force along a plurality of axes, a plurality of electrodes has to be used, increasing the complexity of the device and increasing the cost of production.

SUMMARY

In one general aspect, there is provided a multi-axis sensor including: a pair of electrodes positioned such that at least partial areas thereof face each other; an elasticity member having one of the pair of electrodes installed in its upper portion and another of the pair of electrodes installed in a lower portion; and a sensor unit electrically connected with the pair of electrodes, and configured to detect a change of capacitance value between the pair of electrodes and a change of resistance value of the elasticity member, so as to measure an external force applied to the elasticity member.

The multi-axis sensor may be a hybrid type multi-axis sensor in which the elasticity member has a plate shape with a flat top surface and comprises a dielectric material having a relative permittivity of 1-8.

In the general aspect of the multi-axis sensor, the sensing unit may be configured to distinguish a direction component of the external force applied to the elasticity member based on a change in the capacitance value or a change of the resistance value.

In the general aspect of the multi-axis sensor, the sensor unit may be configured to measure a horizontal component of the external force applied to an upper surface or a lower surface of the elasticity member distinctively from a vertical component of the external force applied to the elasticity member.

In the general aspect of the multi-axis sensor, the sensor unit may be configured to measure a change of capacitance value based on a change in a size of the at least partial areas of the pair of electrodes facing each other, so as to measure a horizontal component of the external force applied to the upper surface or the lower surface of the elasticity member.

In the general aspect of the multi-axis sensor, the sensor unit may be configured to measure a change of capacitance value as a distance between the pair of electrodes changes, so as to measure a horizontal component of the external force applied to the elasticity member.

In the general aspect of the multi-axis sensor, the sensor unit may be characterized to measure a change of resistance value as a size of cross-section of the elasticity member changes, so as to measure a horizontal component of the external force applied to the elasticity member.

In the general aspect of the multi-axis sensor, the elasticity member may comprise a rectangular polymer block comprising a synthetic polymer in which the pair of electrodes is embedded.

In the general aspect of the multi-axis sensor, the pair of electrodes each may comprise a terminal unit; the terminal units of the electrodes may be electrically connected to the sensor unit; and the sensor unit may comprise a processor for calculating magnitudes of the external force along a horizontal direction and a vertical direction.

In the general aspect of the multi-axis sensor, the multi-axis sensor may comprise a display unit that displays the magnitudes of the external force in a numeric value.

In another general aspect, there is provided a method of measuring magnitudes of an external force applied to a multi-axis sensor comprising a first electrode and a second electrode embedded in a dielectric body, the method involving: measuring a resistance value of the dielectric body using the first electrode and the second electrode; measuring a capacitance between value between the first electrode and the second electrode; calculating a horizontal component of the external force based on a change of the capacitance; and calculating a vertical component of the external force based on a change in the resistance of the dielectric body.

In the general aspect of the method, the first electrode of the multi-axis sensor may comprise a crossing unit; the second electrode of the multi-axis sensor may comprise a protruding unit; at least a portion of the crossing unit of the first electrode may overlap with at least a portion of the protruding unit of the second electrode in a vertical direction; and at least a portion the protruding unit of the second electrode may not overlap with the crossing unit of the first electrode in the vertical direction.

In the general aspect of the method, the calculating of the horizontal component and the calculating of the vertical component may be carried out in a processor of a sensor unit of the multi-axis sensor.

Other features and aspects may be apparent from the following detailed description, the drawings, and the claims.

Figure 1:
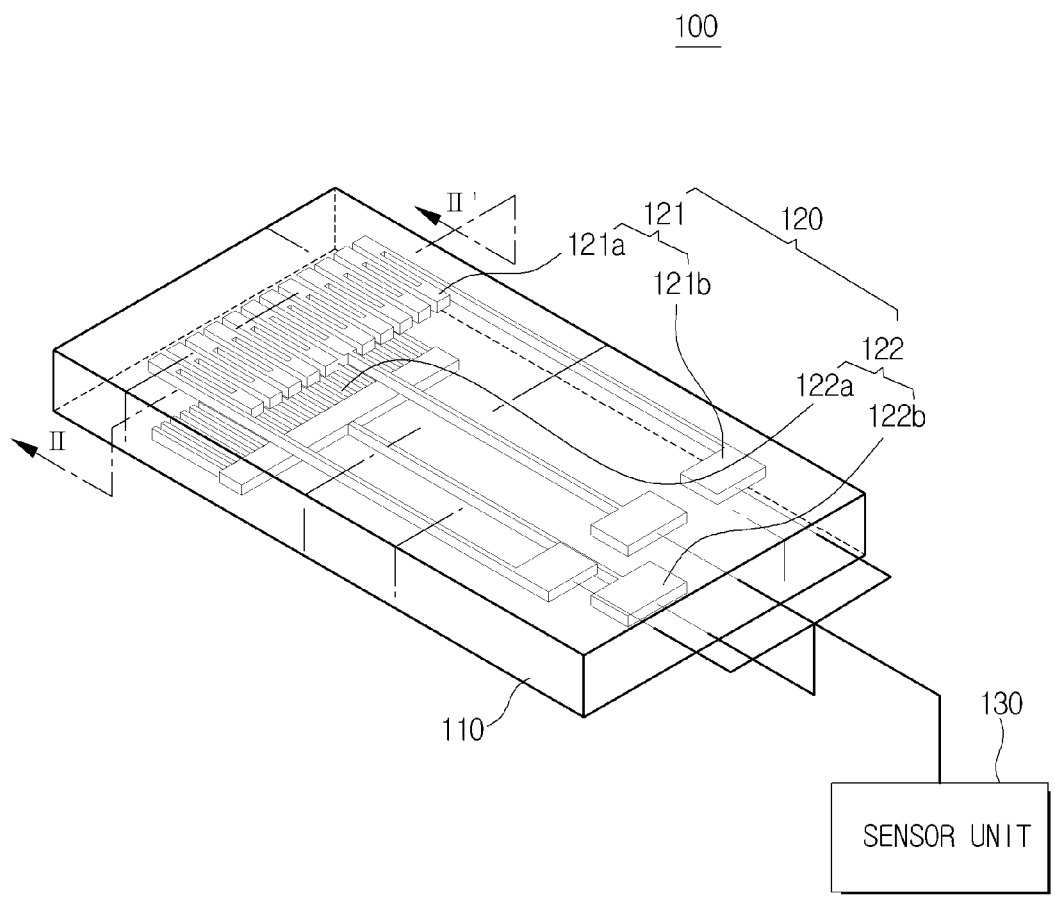
FIG. 1 is a perspective view illustrating the internal structure of an example of a multi-axis sensor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The use of an external force sensor can increase production costs due to complex manufacturing process involving the attachment of a multi-phase sensor. Some sensors using capacitance values require a plurality of electrodes to measure force along a plurality of axes.

Described below are examples of multi-axis sensors. For example, a hybrid type multi-axis sensor may include: a pair of electrodes positioned such that at least partial areas thereof face each other; a flat plate type elasticity member which has permittivity, and has each of the pair of electrodes installed in its upper portion and lower portion, respectively; and a sensor unit which is electrically connected with the pair of electrodes, and distinctively senses a change of capacitance value between the pair of electrodes and a change of resistance value of the elasticity member, so as to measure external force applied to the elasticity member. Also provided are examples of hybrid type multi-axis sensors in which the pair of electrodes are inserted inside the elasticity member. Also provided are examples of hybrid type multi-axis sensors in which, the sensing unit may distinguish a direction of external force applied to the elasticity member according to characteristics of a measured value. The sensor unit may measure external force applied in a direction horizontal to an upper surface or lower surface of the elasticity member distinctively from external force applied in a direction vertical to the upper surface or lower surface of the elasticity member.

In addition, the sensor unit may measure a change of capacitance value which is measured as a size of the at least partial areas of the pair of electrodes facing each other changes, so as to measure external force applied in a direction horizontal to the upper surface or lower surface of the elasticity member.

In addition, the sensor unit may measure a change of capacitance value as a distance between the pair of electrodes changes, so as to measure external force applied in a direction horizontal to the upper surface or lower surface of the elasticity member.

In addition, the sensor unit may measure a change of resistance value as a size of cross-section of the elasticity member changes, so as to measure external force applied in a direction horizontal to the upper surface or lower surface of the elasticity member.

The examples of hybrid type multi-axis sensors provided below may distinctively measure external force of 2-axes directions using a pair of electrodes only.

Also provided are examples of hybrid type multi-axis sensor in which it is possible to measure a capacitance value between electrodes and a resistance value of an elasticity dielectric at the same time, to measure an intensity and direction of the external force.

FIG. 1 is a perspective view of an example of a hybrid type multi-axis sensor. In addition, FIG. 2 illustrates a cross sectional view of the hybrid type multi-axis sensor of FIG. 1 along line II-II'.

Figure 2:
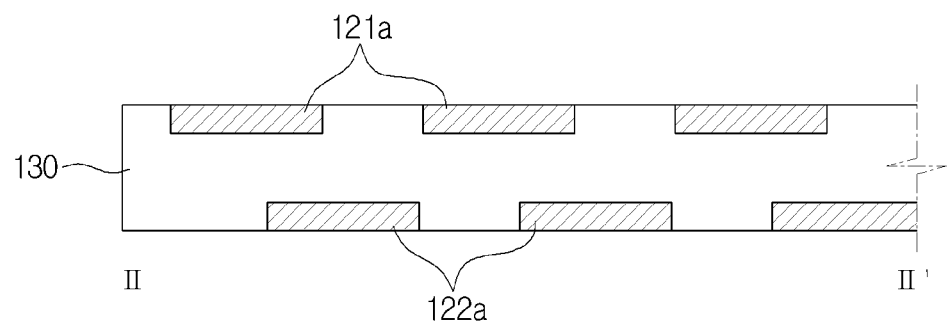
FIG. 2 illustrates a cross sectional view of the multi-axis sensor illustrated in FIG. 1 along line II-IF.

With reference to FIGS. 1 and 2, an example of a hybrid type multi-axis sensor 100 includes an elasticity member 110, a pair of electrodes 120, and a sensor unit 130.

The elasticity member 110 is a structural member to which an external force for measurement is directly applied. The elasticity member 110 may comprise a dielectric material having high permittivity. The relative static permittivity of the dielectric material at 25° C. may range from 1-8, 1-5, or 1-3.

In this example, synthetic polymer, synthetic urethane or synthetic silicon etc. may be used for the elasticity member 110, but it is not limited thereto; any material may be used as long as it is dielectric material having permittivity, and which is flexible and stretchable.

The pair of electrodes 120 are inserted inside the elasticity member 110 and positioned such that they face each other. The pair of electrodes 120 transmits a capacitance value and a resistance value measured by the elasticity member 110 to the sensor unit 130. The dielectric material may substantially fill the entire elasticity member 110 surrounding the pair of electrodes. For example, the elasticity member 110 may be a block filled with a dielectric material. The block may have flat upper and lower surfaces. The block may be a rectangular block, a cubical block, a plate-shaped block, a trapezoidal block, or a structural member having a different shape.

In this example, each of the pair of electrodes 120 may be made of copper (Cu), silver (Ag), nickel (Ni), Iridium (Ir), tin (Sn), aluminum (Al), Stainless Steel, or metal material alloy thereof, but not limited thereto as long as it has electrical conductivity.

Meanwhile, of the pair of electrodes 120, an electrode placed in a relatively upper side of the elasticity member 110 is hereinafter referred to as a first electrode 121, while an electrode placed in a relatively lower side of the elasticity member 110 is hereinafter referred to as a second electrode 122.

With respect to the structure of the pair of electrodes 120, on one end of the first electrode 121 placed in a relatively upper side of the elasticity member 110, there is provided a crossing unit 121a having stripes formed to cross one another repeatedly. On the other end of the first electrode 121, there is provided a terminal unit 121b that is electrically connected to the sensor unit 130, as explained below.

A plurality of protruding units 122a is provided on one end of the second electrode 122 placed in a relatively lower side of the elasticity member 110. On the other end of the second electrode 122, there is provided a terminal unit 122b which is electrically connected to the sensor unit 130, just as the first electrode 121.

The crossing unit 121a of the first electrode 121 and the protruding units 122a of the second electrode 122 are distanced from each other, but they are placed such that at least partial areas thereof face each other. That is, each of the crossing unit 121a and the protruding units 122a includes at least an area that faces each other, and also at least an area that does not face each other.

In other words, vertically above an area of the protruding unit 122a of the second electrode 122, the crossing unit 121a is not placed, whereas vertically above the other area of the protruding unit 122a of the second electrode 121a, the crossing unit 121a is placed, covering the protruding unit 122a.

Meanwhile, in this example, the first electrode 121 includes the crossing unit 121a and the protruding unit 122a of the second electrode 122. However, the format and arrangement of the first electrode 121 and second electrode 122 are not limited thereto as long as it is a structure which includes at least partial areas which face each other, and at least partial areas which do not face each other.

The sensor unit 130 is a member that is electrically connected to each of the pair of electrodes 120, to detect and measure external force applied to the elasticity member 110 from outside.

Hereinbelow, operations of the abovementioned example of a hybrid type multi-axis sensor 100 will be explained in detail.

The operations of the example will be explained based on the assumption that a direction parallel to a longitudinal direction of the elasticity member 110 is x direction, and a direction vertical to the longitudinal direction of the elasticity member 110 and is vertical to an upper surface or lower surface of the elasticity member 110 is y direction.

When predetermined external force is applied to the elasticity member 110, the sensor unit 130 that is electrically connected to the first electrode 121 and the second electrode 122 detects a change in capacitance value between the first electrode 121 and second electrode 122 and a change in resistance value of the elasticity member 110, to measure an intensity and components of the external force applied to the elasticity member 110.

Structures of and changes in characteristics of each case where external force is applied in an x direction and in a y direction will be explained hereinbelow, followed by an explanation on an example of a method of the sensor unit 130 measuring a component and intensity of external force applied to the elasticity member.

Figure 3:
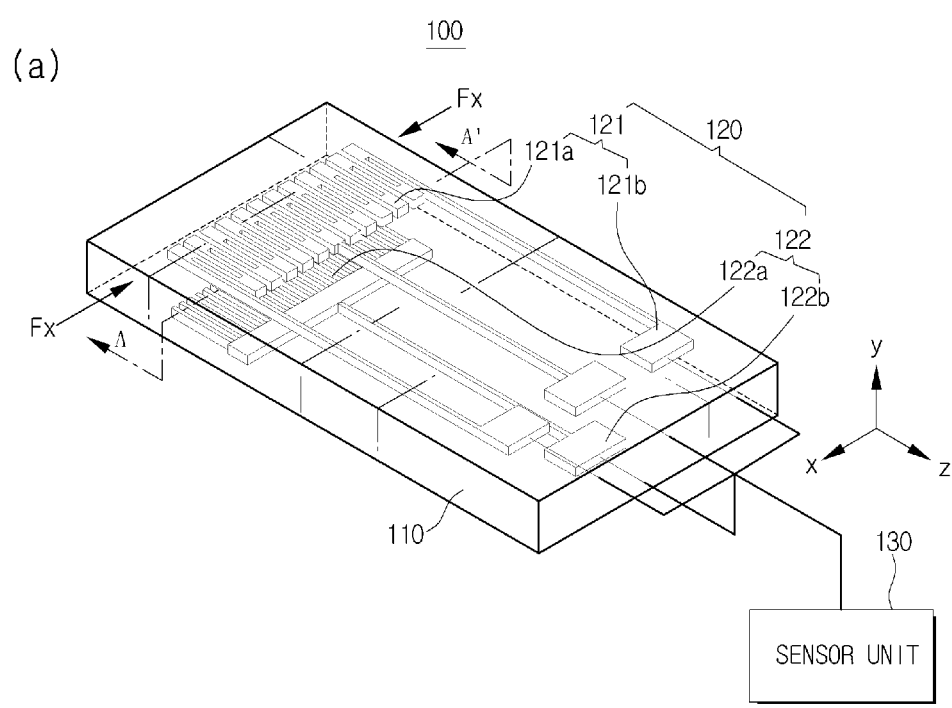
FIG. 3(a) is a perspective view illustrating the operation of the multi-axis sensor of FIG. 1 in an event an external force of x direction is imposed on the sensor.
FIG. 3(b) is a cross sectional view of the multi-axis sensor of FIG. 3(a) along line A-A'.
Figure 3:
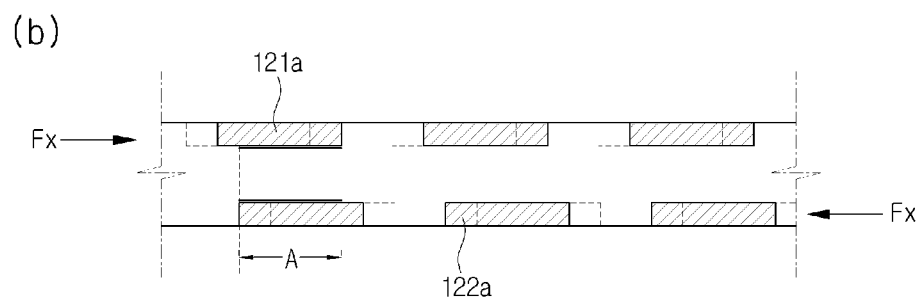

When the Direction of External Force Applied to the Elasticity Member is x Direction FIG. 3 is for explaining operations of a case where external force is applied in x direction to the hybrid type multi-axis sensor of FIG. 1.

As illustrated in FIG. 3(a), when an external force of x direction is applied to the elasticity member 110, there is no deformation of the elasticity member 110 itself, but a size of the area in which the first electrode 121 overlaps with the second electrode 122 along the y direction changes.

With reference to FIG. 3(b), which illustrates a cross-sectional review of the sensor along line A-A', when a shear force is applied an x direction, the first electrode 121 that is located on an upper side of the sensor relative to the second electrode 122 undergo a relative location change from its initial location according to the direction of the shear force. Thus, the size of area of the crossing unit 121a of the first electrode 121 that overlaps with the protruding unit 122a of the second electrode 122 located therebelow either increases or decreases.

Herein, a capacitance value c measured between the first electrode 121 and second electrode 122 conforms to mathematical formula 1 below:

$$c = \frac{\varepsilon_o \cdot \varepsilon_r \cdot A}{d} \quad \text{[Mathematical formula 1]}$$

($\varepsilon_r$: permittivity of the dielectric material of the elasticity member, $\varepsilon_o$: vacuum permittivity, A: size of area of the first electrode and second electrode facing each other, d: distance between the first electrode and second electrode)

According to the above mathematical formula 1, when shear force in x direction is applied to the elasticity member 110, a size of area A of the first electrode 121 and second electrode 122 facing each together changes, and accordingly, a capacitance value c also changes.

In addition, a resistance value of the dielectric material of the elasticity member 110 conforms to mathematical formula 2 below.

$$\frac{RL}{E} \quad \text{[Mathematical formula 2]}$$

(R: resistance value of the elastic member, L: length of the elastic member; E: size of area of the cross section vertical to the longitudinal direction of the elastic member)

That is, according to the above mathematical formula 2, a resistance value R of the elastic member 110 is proportionate to length L of the elastic member 110, and inversely proportionate to a size of area E of the cross-section vertical to the longitudinal direction of the elastic member 110.

Meanwhile, even if shear force of x direction is applied to the elastic member 110, there is no deformation of shape in the elastic member 110 itself, and thus the resistance value R is kept constant.

As a result, due to the external force applied in x direction, the capacitance value between the first electrode 121 and second electrode 122 changes, but since the resistance value of the elastic member 110 is kept constant. Thus, in this case, the sensor unit 130 becomes able to detect changes of the capacitance value only.

Figure 4:
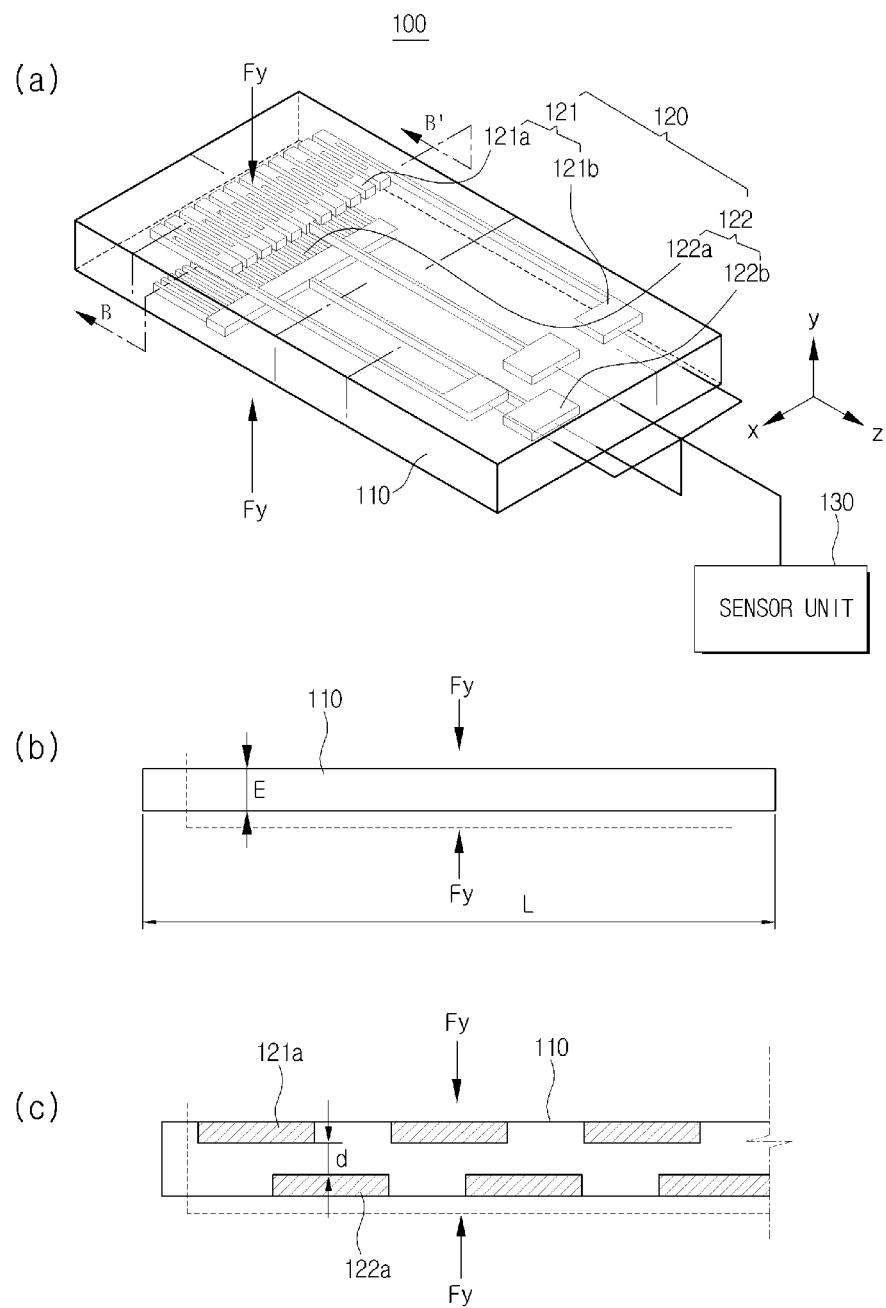
FIG. 4(a) is a perspective view illustrating the operation of the multi-axis sensor of FIG. 1 in an event an external force of y direction is imposed on the sensor.
FIG. 4(b) is a cross sectional view of the multi-axis sensor of FIG. 4(a) along line B-B'.
FIG. 4(c) is a cross sectional view of the multi-axis sensor of FIG. 4(a) along line B-B'.

When the Direction of External Force Applied to the Elasticity Member is y Direction FIGS. 4(a), 4(b) and 4(c) explain the operation of a hybrid type multi-axis sensor in an event external force in y direction is applied to the sensor.

As illustrated in FIG. 4(a), in a case where external force of y direction is applied to the elasticity member 110, a deformation of shape occurs in the elasticity member 110.

With reference to FIG. 4(b), which is a cross-section cut along line B-B' of FIG. 4(a), assuming that external force of y direction is a compressive force, the length L of the elasticity member 110 increases and the size of area E of the cross-section is reduced by the compressive force of y direction.

Thus, based on the above-mentioned mathematical formula 2, the resistance value R of the elasticity member increases, which would be sensed by the sensor unit 130.

In addition, as illustrated in FIG. 4(c), since the distance d between the first electrode 121 and second electrode 122 is reduced by the compressive force of y direction, the capacitance value between the first electrode 121 and second electrode 122 would also change, as demonstrated by the mathematical formula 1.

Consequently, when external force of y direction is applied to the elasticity member 110, the sensor unit 130 may sense the changes in capacitance value of the first electrode 121 and second electrode 122 and in resistance value of the elasticity member 110, at the same time.

Hereinbelow is explanation on a method of measuring an intensity and direction of external force applied to the elasticity member 110, by the sensor unit 130.

Figure 5:
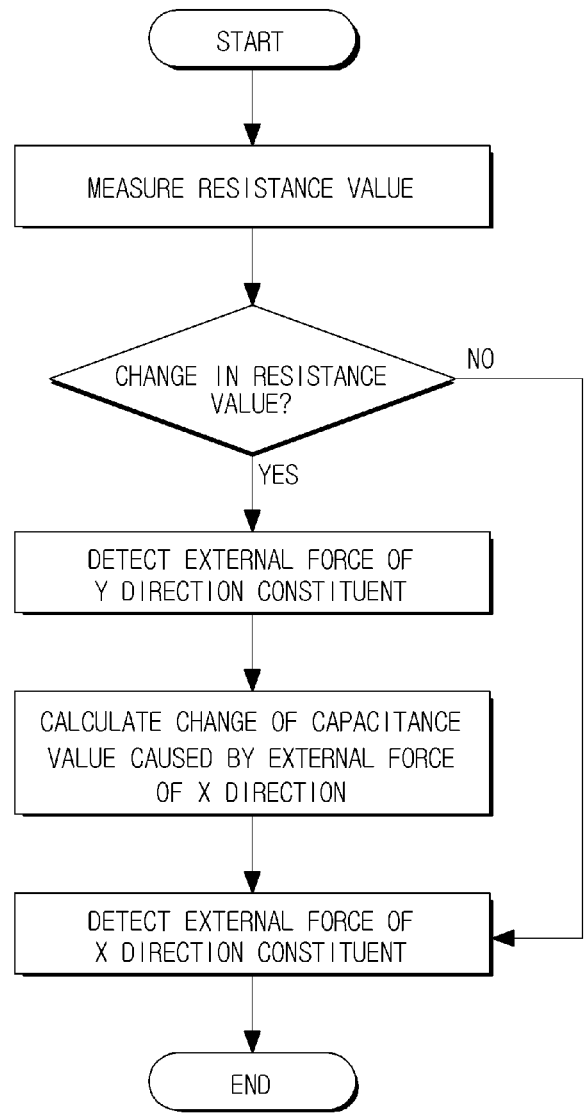
FIG. 5 is a flowchart illustrating an example of a method of detecting and measuring a direction constituent and intensity of external force applied to the multi-axis sensor of FIG. 1.

FIG. 5 is a flowchart of a method of measuring a direction constituent and intensity of external force applied to the hybrid type multi-axis sensor of FIG. 1.

With reference to FIG. 5, when external force is applied to the elasticity member 110, the sensor unit 130 determines whether or not there is a change in resistance value of the elasticity member 110.

If a change of resistance value of the elasticity member 110 is not sensed by the sensor unit 130, the sensor unit 10 can determine that only an external force of x direction has been applied, and an external force of y direction has not been applied. Thus, the capacitance value between the first electrode 121 and second electrode 122 measured may be analyzed to calculate the external force applied in x direction.

However, if a change of resistance value of the elasticity member 110 is sensed by the sensor unit 130, the sensor unit 130 can determine that an external force of y direction has been applied to the sensor. Thus in this case, an overall external force which includes external force of x direction and external force of y direction is calculated.

First of all, based on the change of resistance value of the elasticity member 110 measured, the change of capacitance value due to the external force of y direction constituent and the external force of y direction are calculated.

Next, using the measured change of capacitance value caused by the external force of y direction constituent and the change of overall capacitance value, a change of capacitance value caused by external force of x direction constituent is calculated.

Lastly, using the calculated change of capacitance value caused by x direction constituent external force, the external force of x direction is measured.

Therefore, according to the examples of sensors described above, it is possible to detect changes of a capacitance value and resistance value at the same time in a sensor having a relatively simple structure of a pair of electrodes, so as to distinctively measure an intensity of force in 2-axe directions and determine the direction constituents.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Description of Reference Numerals

100: HYBRID TYPE MULTI-AXIS SENSOR ACCORDING TO AN EXEMPLARY EMBODIMENT OF THE PRESENT INVENTION
110: ELASTICITY MEMBER
120: ELECTRODE
130: SENSOR UNIT

What is claimed is:

1. A multi-axis sensor comprising:
a pair of electrodes positioned such that at least partial areas thereof face each other;
an elasticity member having one of the pair of electrodes installed in its upper portion and another of the pair of electrodes installed in a lower portion; and
a sensor unit electrically connected with the pair of electrodes, and configured to detect a change of capacitance value between the pair of electrodes and a change of resistance value of the elasticity member measured using the pair of electrodes, so as to measure an external force applied to the elasticity member.

2. The multi-axis sensor according to claim 1, the multi-axis sensor is a hybrid type multi-axis sensor in which the elasticity member has a plate shape with a flat top surface and comprises a dielectric material having a relative permittivity of 1-8.

3. The multi-axis sensor according to claim 1,
wherein the sensing unit is configured to distinguish a direction component of the external force applied to the elasticity member based on a change in the capacitance value or a change of the resistance value.

4. The multi-axis sensor according to claim 3,
wherein the sensor unit is configured to measure a horizontal component of the external force applied to an upper surface or a lower surface of the elasticity member distinctively from a vertical component of the external force applied to the elasticity member.

5. The multi-axis sensor according to claim 4,
wherein the sensor unit is configured to measure a change of capacitance value based on a change in a size of the at least partial areas of the pair of electrodes facing each other, so as to measure a horizontal component of the external force applied to the upper surface or the lower surface of the elasticity member.

6. The multi-axis sensor according to claim 4,
wherein the sensor unit is configured to measure a change of capacitance value as a distance between the pair of electrodes changes, so as to measure a horizontal component of the external force applied to the elasticity member.

7. The multi-axis sensor according to claim 4,
wherein the sensor unit is characterized to measure a change of resistance value as a size of cross-section of the elasticity member changes, so as to measure a horizontal component of the external force applied to the elasticity member.

8. The multi-axis sensor according to claim 1, wherein the elasticity member comprises a rectangular polymer block comprising a synthetic polymer in which the pair of electrodes is embedded.

9. The multi-axis sensor according to claim 1, wherein the pair of electrodes each comprises a terminal unit; the terminal units of the electrodes are electrically connected to the sensor unit; and the sensor unit comprises a processor for calculating magnitudes of the external force along a horizontal direction and a vertical direction.

10. The multi-axis sensor according to claim 9, wherein the multi-axis sensor comprises a display unit that displays the magnitudes of the external force in a numeric value.

11. A method of measuring magnitudes of an external force applied to a multi-axis sensor comprising a first electrode and a second electrode embedded in a dielectric body, the method comprising:
measuring a resistance value of the dielectric body using the first electrode and the second electrode;

measuring a capacitance value between the first electrode and the second electrode;

calculating a horizontal component of the external force based on a change of the capacitance; and calculating a vertical component of the external force based on a change in the resistance of the dielectric body.

12. The method of claim 11, wherein the first electrode of the multi-axis sensor comprises a crossing unit; the second electrode of the multi-axis sensor comprises a protruding unit; at least a portion of the crossing unit of the first electrode overlaps with at least a portion of the protruding unit of the second electrode in a vertical direction; and at least a portion the protruding unit of the second electrode does not overlap with the crossing unit of the first electrode in the vertical direction.

13. The method of claim 12, wherein the calculating of the horizontal component and the calculating of the vertical component are carried out in a processor of a sensor unit of the multi-axis sensor.

* * * * *